US010307933B2

(12) United States Patent
Lehmonen

(10) Patent No.: US 10,307,933 B2
(45) Date of Patent: Jun. 4, 2019

(54) METHOD FOR PRODUCING A WOOD STRUCTURE WITH A DECORATIONAL PATTERN, A DEVICE FOR PATTERNING A PIECE OF WOOD AND A DECORATIONAL WOOD STRUCTURE

(71) Applicant: Jouni Lehmonen, Sirkkamaki (FI)

(72) Inventor: Jouni Lehmonen, Sirkkamaki (FI)

( * ) Notice: Subject to any disclaimer, the term of this patent is extended or adjusted under 35 U.S.C. 154(b) by 0 days.

(21) Appl. No.: 15/578,729

(22) PCT Filed: May 30, 2016

(86) PCT No.: PCT/FI2016/050374
§ 371 (c)(1),
(2) Date: Dec. 1, 2017

(87) PCT Pub. No.: WO2016/193541
PCT Pub. Date: Dec. 8, 2016

(65) Prior Publication Data
US 2018/0215068 A1    Aug. 2, 2018

(30) Foreign Application Priority Data

Jun. 4, 2015 (FI) ..................................... 20155427

(51) Int. Cl.
*B32B 38/10* (2006.01)
*B27M 1/08* (2006.01)
(Continued)

(52) U.S. Cl.
CPC .................. *B27M 1/08* (2013.01); *B27C 5/00* (2013.01); *B27C 5/06* (2013.01); *B27M 3/0053* (2013.01);
(Continued)

(58) Field of Classification Search
CPC ................................. B32B 38/10; B27M 1/003
See application file for complete search history.

(56) References Cited

U.S. PATENT DOCUMENTS 3,320,984 A    5/1967 Stolesen et al.
3,756,295 A    9/1973 Halop
(Continued)

FOREIGN PATENT DOCUMENTS

DE    102009052642    5/2011
FI    117332    9/2006
GB    2240068    7/1991

OTHER PUBLICATIONS

International Search Report, International Application No. PCT/FI2016/050374, dated Sep. 21, 2016.
(Continued)

*Primary Examiner* — Alexander S Thomas
(74) *Attorney, Agent, or Firm* — Fildes & Outland, P.C.

(57) ABSTRACT

A method for mechanically producing a wood structure with a decorative pattern is disclosed, wherein partial patterns are processed onto a working face of a wood structure by moving at least one milling cutter of a processing head of a device for patterning transversely to the wood structure with the axis of rotation of the milling cutter at an inclined angle relative to the place of the working face in such a way that grooves that form the partial pattern are formed on the working face, each of the grooves having two planes set at an angle relative to each other while the depth of the groove changes in the transverse direction of the groove. In the method, the wood structure is formed of at least two or more adjacently placed pieces of wood each having two edges, wherein several successive grooves are formed onto the working face of at least two pieces of wood with a single milling movement, each single milling movement beginning or ending at an edge of the piece of wood so that the partial patterns form together the pattern of the wood structure. A corresponding device for patterning and a decorative wood structure are also disclosed.

9 Claims, 14 Drawing Sheets

(51) Int. Cl.
    *B27C 5/00*         (2006.01)
    *B44C 1/22*         (2006.01)
    *B44C 5/04*         (2006.01)
    *B27C 5/06*         (2006.01)
    *B27M 3/00*       (2006.01)
    *B27M 1/00*       (2006.01)

(52) U.S. Cl.
    CPC ................ *B44C 1/22* (2013.01); *B44C 1/222* (2013.01); *B44C 5/043* (2013.01); *B27M 1/003* (2013.01); *B32B 38/10* (2013.01)

(56) References Cited

U.S. PATENT DOCUMENTS

| | | |
|---|---|---|
| 4,263,947 A | 4/1981 | Steiling |
| 5,123,466 A | 6/1992 | Ellsworth |
| 2010/0098508 A1 | 4/2010 | Kulikov |

OTHER PUBLICATIONS

Supplementary European Search, EP Application No. 16802633.4, dated Dec. 4, 2018.
English language machine translation of DE 102009052642.

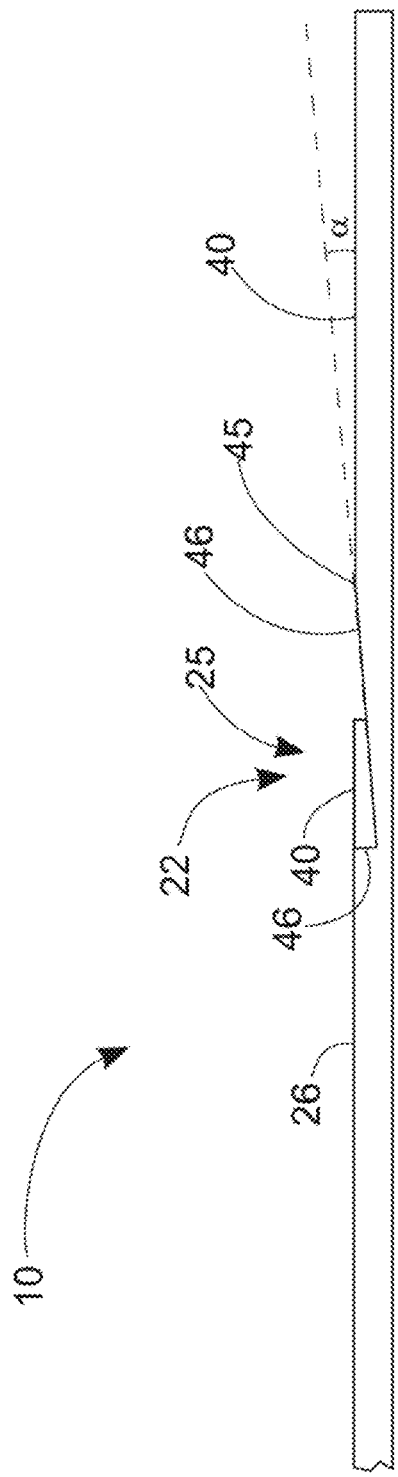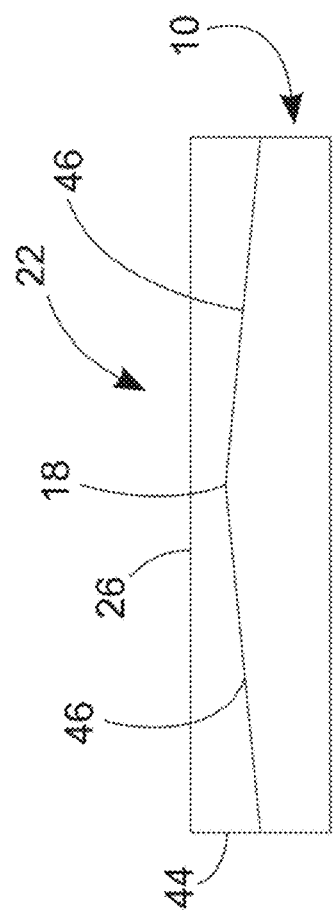
Fig. 2a
Fig. 2b

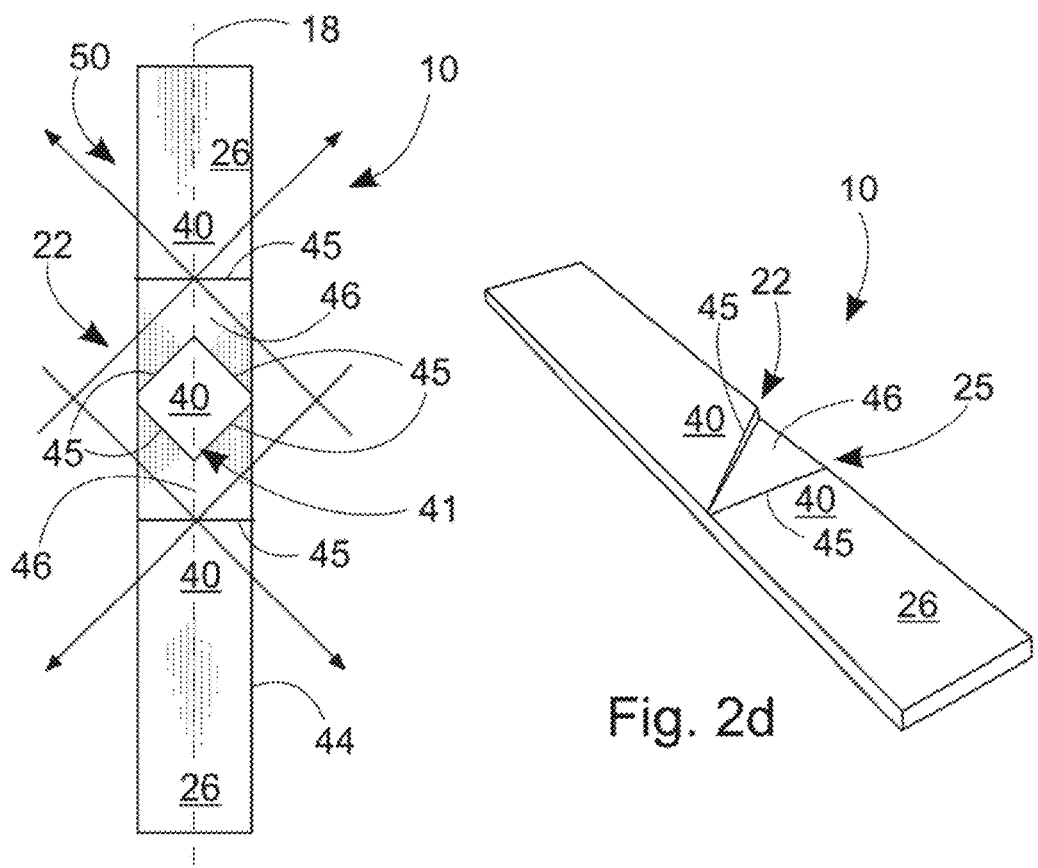
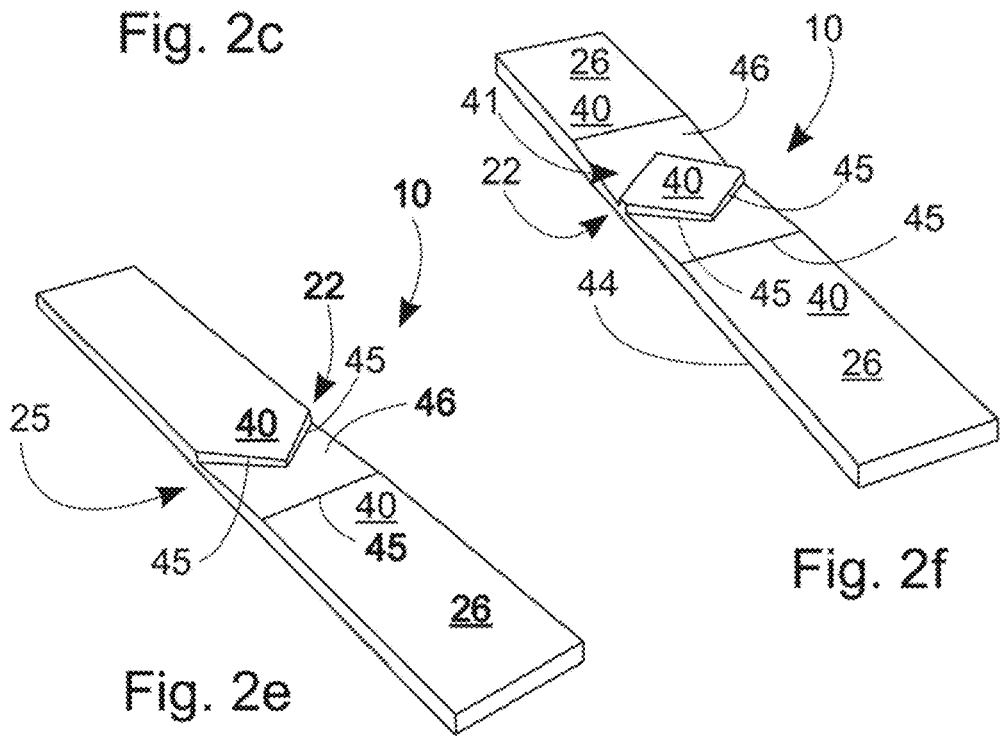

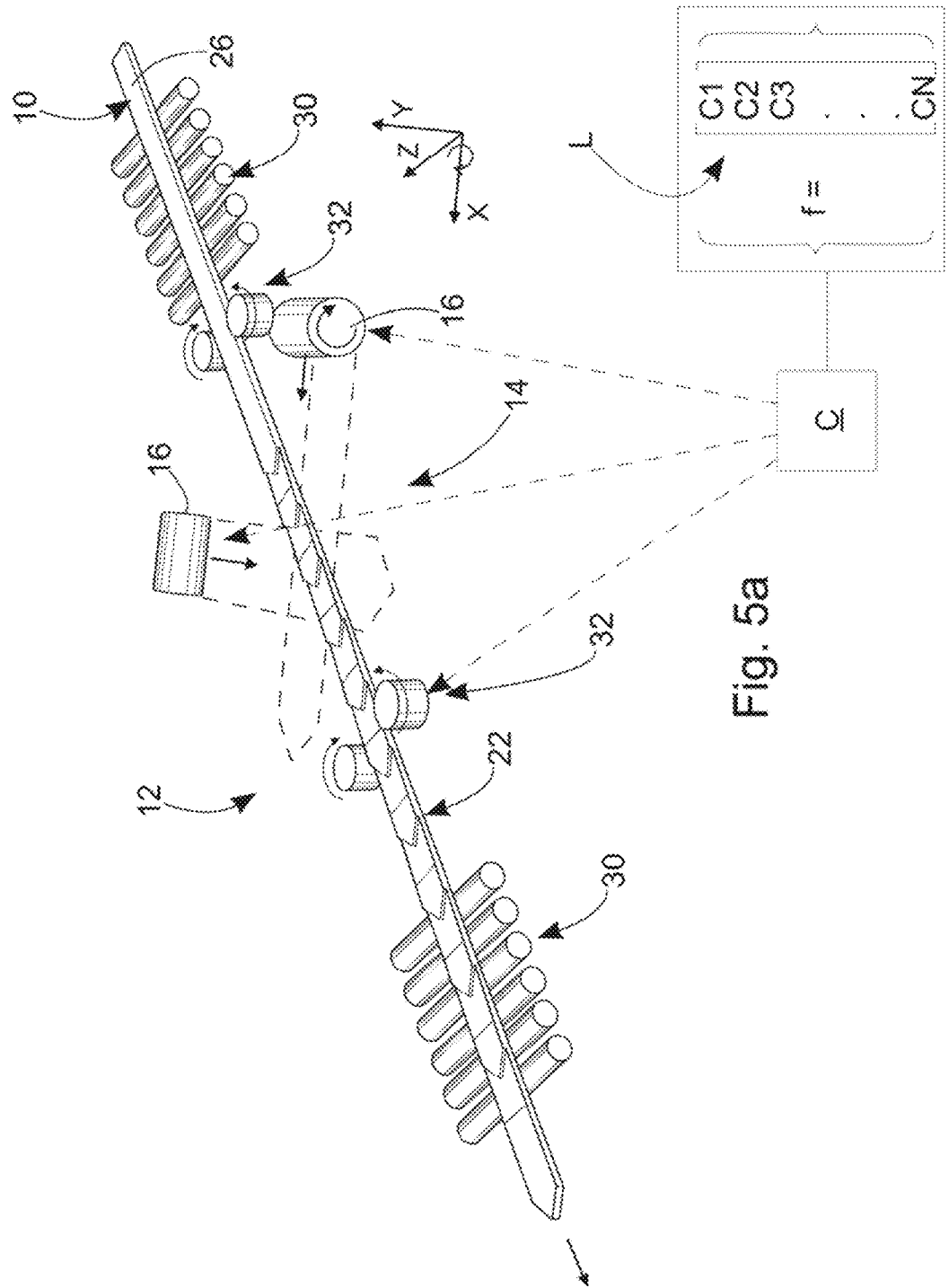

METHOD FOR PRODUCING A WOOD STRUCTURE WITH A DECORATIONAL PATTERN, A DEVICE FOR PATTERNING A PIECE OF WOOD AND A DECORATIONAL WOOD STRUCTURE

CROSS-REFERENCE TO RELATED APPLICATION

This application claims benefit of priority from International Patent Application No. PCT/FI2016/050374 filed May 30, 2016, which claims benefit of priority from Finland Patent Application No. 20155427 filed Jun. 4, 2015, both of which are incorporated by reference in their entirety.

FIELD OF THE INVENTION

The invention relates to a method for mechanically producing a wood structure with a decorational pattern, wherein partial patterns are processed onto the working face of the wood structure by moving at least one milling cutter of the processing head of a device for patterning transversely to the wood structure while the axis of rotation of the milling cutter is at an inclined angle relative to the plane of the working face in such a way that grooves that form a partial pattern are formed onto the working face, each of the grooves having two planes set at an angle relative to each other while the groove depth changes in the transverse direction of the groove.

The invention also relates to a device for patterning a piece of wood and a decorational wood structure.

BACKGROUND OF THE INVENTION

From prior art, various types of timber, which generally means planks, boards, panels, plates and battens, also known as industrial sawn and dressed timber or wood products are known. Timber is most generally mechanically processed by sawing, planing or milling from wood or composite wood materials.

The most common sawn and dressed timber is produced as rectangular and elongated pieces, such as boards and planks that have a symmetrical cross-section, or a so-called cross-section profile. A more decorative or an otherwise more profiled wood product group consists of various panels and decorative boards. The cross-section of such panels and decorative boards is often a semi-profile or a so-called form profile. In addition, there is a great number of various battens, the cross-section of which can be very diversiform and decorative. However, battens are usually characterised by a more delicate construction compared to boards, planks and panels. Nevertheless, it is common for all of these that the cross-sectional form of the profile including decorations always remains the same from end to end of the piece.

The minority of timber for sawmill and planing mill industries is decorative timber where decorations deviate from the profile direction and do not extend from end to end of the piece. Such timber forms only very small part of the entire timber production and is usually directed to special wood products with low consumption and production quantities.

An example of these are patterned fence boards having decorations made at their edges with a jigsaw. Complete new decorations are formed between the boards. Another example may be boards carved on their surfaces with a varying structure, which makes the board surface look as if it were worn.

During production, processes are often used, such as 3D milling or water jet cutting, as well as form cutting tools and blade devices. However, methods are often tied to a single decorative model or separately programmable patterns. In known systems, the structure of an individual decoration cannot be modified or adapted at all, or at least not in a versatile manner. The production performance is also often too slow and difficult to adjust in order to decorate profile surfaces of different sizes with high efficiency. The methods are most often directed to marginal processed products.

Publication GB 2240068 A1 is known as prior art wherein a pattern is formed in a piece of wood with a routing cutter. The pattern can be very complex. However, a problem with such a solution is that it is not suitable for use in industrial production where the dimensions of pieces of wood vary and a sufficient speed, efficiency and production volume are required in the production. The method for forming a pattern proposed in the publication is slow and complicated and it can only be used to form a certain pattern. Thus, a product produced in this way becomes expensive.

Publication U.S. Pat. No. 5,123,466 is also known as prior art wherein a method for processing decorative patterns on a door, for example, is disclosed. In the method, a router blade set in an inclined position is used to form grooves transversely to a piece of wood. However, a problem with such a method is poor modifiability for other patterns and laborious implementation of complicated patterns. In addition, the routing technique used in the method is slow because an individual groove needs several router movements for processing.

A problem with the use of decorative boards may also be the tendency of pieces of wood to warp over time. For this reason, products manufactured from pieces of wood, for example, may become poorly functioning over time because they are no longer dimensionally accurate. Doors in particular are such products.

SUMMARY OF THE INVENTION

An object of the invention is to provide a method that is more advantageous than prior art methods for forming a pattern in a piece of wood, the method being usable regardless of the dimensions of the currently processable wood product and applicable to industrial scale production. Furthermore, an object of the method according to the invention is to reduce warping of pieces of wood. Another object of the invention is to provide a decorational wood structure that is widely suitable for industrial wood processing production and has less warping compared to prior art decorational wood structures. In addition, an object of the decorational wood structure is to form patterns that are more complicated than before more advantageously than heretofore.

The object of the method according to this invention can be achieved with a method for mechanically producing a wood structure with a decorational pattern, wherein partial patterns are processed onto the working face of the wood structure by moving at least one milling cutter of the processing head of a device for patterning transversely to the wood structure with the axis of rotation of the milling cutter at an inclined angle relative to the working face plane in such a way that grooves forming a partial pattern are formed onto the working face, each of the grooves having two planes set at an angle relative to each other while the groove depth changes in the transverse direction of the groove. In the method, the wood structure is formed of at least two or more adjacently placed pieces of wood, each of which has two edges, wherein several successive grooves are formed onto the working face of at least two of the pieces of wood with a single milling movement, each single milling movement beginning or ending at an edge of the piece of wood so that partial patterns form together the pattern of the wood structure. Using an inclined milling cutter with a straight blade enables formation of the groove that forms the partial pattern onto the working face of the piece of wood using the angle of the milling cutter, in which case the same milling cutter can be used in large amounts of timber with varying dimensions. In other words, the milling cutter is inclined relative to the working face in such a way that only one of the edges of the milling cutter participates in the formation of the groove. A key advantage of the invention is that the method can be used to form varying partial patterns during the same processing cycle without replacing or changing the milling cutter. Partial patterns form a mosaic-like pattern in the wood structure. In this way, the processing efficiency of patterning and production of wood structures can be increased compared to known methods.

Advantageously, a milling cutter is used in the method having its length in the direction of the axis of rotation and the cross-directional diameter greater than or equal to the longest dimension of any one of the planes of the groove in the transverse direction of the groove. Thus, the edges of the milling cutter extend out from the working face, in which case mathematical intermittency of partial patterns is possible. This also makes it possible that an individual movement of the milling cutter forms an individual groove, in which case the formation of grooves is remarkably fast.

In the method, the pattern in the wood structure is advantageously divided into partial patterns with software means and the software means form the movement tracks of the milling cutter for the partial patterning of the piece of wood based on the partial patterns. The method can be used to produce various mathematical partial patterns onto working faces of pieces of wood with varying sizes in a simple and fast way, these partial patterns forming a specific entity of patterns when connected. Thus, a simple single-cut that forms an individual partial pattern can be used to form notably complicated patterns by connecting pieces of wood with partial patterns side by side. In this context, a single-cut means an individual movement of the milling cutter to form a groove in the transverse direction of the piece of wood.

Advantageously, an individual groove is formed with one movement of the milling cutter. This enables a formation of quick partial patterning.

Advantageously, a mathematical algorithm is used in the method for controlling the partial patterning to form a complete pattern in the wood structure. With a mathematical algorithm, a pattern for a wood structure can be divided into partial patterns in separate pieces of wood and connectable pieces of wood can be produced according to a plan. Finally, by connecting the pieces of wood, a complete wood structure is provided, which may have a very complex pattern.

Advantageously, a milling cutter with a straight blade is used in the method for processing all partial patterns. The design of a milling cutter with a straight blade is simple and the cutter is widely suitable for the production of partial patterns of various sizes as long as the size of the milling cutter is sufficiently large. A milling cutter with a straight blade can produce various patterns in a more versatile way than a milling cutter with a curved blade, and a milling cutter with a straight blade is more affordable to manufacture compared to one with a curved blade.

Advantageously, the milling cutter moves with essentially parallel movements. Thus, the groove to be produced with the milling cutter can be formed remarkably quickly, which enables the efficiency of large industrial scale production.

Advantageously, each partial pattern has a maximum of two single-cuts. In this way, each partial pattern can be formed quickly with a single operation.

According to an embodiment, the pattern is formed, based on an existing pattern model, in steps during which the pattern model to be formed onto the wood structure is selected, dimensions and coordinates of the pattern model are defined and the pattern model is divided into rasters according to the dimensions of the piece of wood to be partially patterned and the dimensions of the pattern model. Furthermore, the degree of darkness of the partial pattern in each raster is determined, the depth of the single-cut of this raster is determined based on the degree of darkness of each raster, and control commands are created for the device for patterning based on the depth of the single-cut to produce partial patterns in individual pieces of wood. In this way, a complete pattern model can be produced, such as a wood structure provided with a corresponding pattern, based on a photograph, industrially and efficiently.

Each depth of a groove of a partial pattern can be selected based on the darkness determined in the pattern model raster in such a way that the groove depth increases as the raster darkness increases. In this way, different hues of colour can be visualised in the pattern.

Advantageously, said partial patterns are processed onto the working face that has been formed onto the dimensionally smaller surface of the piece of wood to achieve a higher processing depth and a smaller raster size. Thus, the depth of the single-cuts of partial patterns to be made in the piece of wood can be higher enabling production of more forcefully three-dimensional patterns. Thus, the width of the working face can be 19 mm, for example, while it would normally be 45 mm when processing onto a wider working face.

Advantageously, the planes of the groove are at a right angle relative to each other. Thus, the groove can be processed with a right angle milling cutter, which is affordable to manufacture.

The partial patterns of pieces of wood of a wood structure can be formed by mathematically multiplying or dividing the same groove length. In this way, partial patterns of adjacent pieces of wood are correctly aligned relative to each other with equal depths thus forming an aesthetically first-class result. In intermittent patterning, cutting lines of milling cutters can be reflected to different sides of the piece to be processed.

In this way, for example, a pattern with a triangular or canonical shape can be produced.

According to an embodiment, the milling cutter is moved, in addition to the transverse direction of the piece of wood, perpendicularly to the plane of the working face. Lifting the milling cutter at a perpendicular level relative to the working face during the movement enables the formation of triangular partial patterns, for example. Advantageously, the axis of rotation of the milling cutter is at an angle relative to the normal of the plane of the piece of wood to be partially patterned, while the edge of the milling cutter forms the groove for the partial pattern.

Advantageously, in a cut with an inclination of 45°, the relation between the pitch length and the piece width is such that, when the milling cutter is at the centre of the piece of wood, the milling cutter cuts the piece of wood in the transverse direction through the piece of wood.

According to an embodiment, each piece of wood is provided with partial patterns. Thus, partial patterns continue from one piece of wood to another in the pattern forming the complete pattern.

Advantageously, each milling cutter is moved with straight movements at a pitch angle of 2-10°, advantageously 3-7° relative to the working face plane. Thus, means moving the milling cutter can have a simple design and fast movements. In other words it can be said that milling cutters are moved with parallel/back and forth movements. On the other hand, the use of a pitch angle enables a straight shape of groove planes and edges of the unpatterned part of the piece of wood.

According to an embodiment, the depth of intermittent partial patterns is linearly reduced in successive repeating partial patterns in such a way that a visual impression of a fading pattern is achieved in the wood structure.

Advantageously, a partial pattern is processed onto the working face of a piece of wood by reflecting around the longitudinal centre line of the working face and/or by intermittent processing relative to the longitudinal direction of the working face using two or more milling cutters. The need to change the settings of the milling cutter is very small, since the piece of wood is always centred with the transfer means of the device for patterning regardless of the dimensions of the piece of wood. In this way, notably more versatile partial patterns can be produced onto the working face of a piece of wood without extraordinary steps for turning the piece of wood.

According to an embodiment, the pitch angle for the cutting of milling cutters remains constant when producing patterns onto pieces of wood with varying dimensions.

The milling cutter can be moved back and forth processing the piece of wood in both directions. Thus, the piece of wood must be moved between the cuts to achieve the benefit.

In the method, the centre line of the working face is advantageously adapted at the mathematical centre of the cuts providing thereby an individual partial pattern with symmetrical forms, which is simultaneously a part of a larger mathematical pattern. Advantageously, the partial pattern is processed symmetrically relative to the feed line of the piece of wood. Thus, the method is suitable for pieces of wood with varying widths by only adjusting the cutting height and stoppers without any other equipment modifications. In this context, adjustment of the distance between milling cutters means retracting the milling cutters further away from the edge of the piece of wood. Advantageously, the same blade setting can be used to process the same pattern, for example, onto a thin outer edge or a wider surface of a board only by adjusting stoppers and the cutting height.

Milling cutters can operate alternately. Thus, opposite milling cutters cannot contact each other and become blunt.

Milling cutters can be moved in two different directions. In this way, for example, a pattern with a triangular or canonical shape can be produced.

According to an embodiment, the milling cutter is retracted to feed the piece of wood. In this way, the same milling cutter can be used to process pieces of wood with different dimensions without adjusting the milling cutter.

The object of the decorational wood structure according to the invention can be achieved with a decorational wood structure that includes a working face, said working face including at least two grooves that form partial patterns and an unpatterned part, in which decorational wood structure each groove has two planes set at an angle relative to each other and the groove depth changes in the transverse direction of the groove. The wood structure includes at least two pieces of wood with a partial pattern formed in at least two pieces of wood and the pieces of wood with partial patterns are arranged side by side in the wood structure to form a wood structure that includes a complete pattern. By connecting pieces of wood with partial patterns, a remarkably great number of different decorational wood structures, even with very complicated patterns, can be formed in a very simple and industrially efficient way. Grooves forming the partial pattern also reduce internal stresses in the piece of wood reducing thereby warping of the wood structure caused by moisture variations in wood.

Advantageously, the piece of wood is elongated and its edges are longitudinal and ends are transverse relative to the piece of wood. For example, such a piece of wood can be a board or a plank, which is easy to industrially process when the piece of wood is transported longitudinally in the process.

Advantageously, each groove has ends, of which at least one is at the edge of the wood structure. This enables the connection of pieces of wood in such a way that partial patterns continue from one piece of wood to another.

The width of the groove may increase in the longitudinal direction or it can have a constant width.

Advantageously, the planes of the groove are at a right angle relative to each other. In this case, a right angle milling cutter can be used.

Advantageously, the groove extends, at least at one end, until to the edge of the wood structure. This enables the formation of the groove with a milling cutter using a quick parallel movement.

Advantageously, the working face has a centre line and edges, and the plane of the groove is at a pitch angle of 2-10°, advantageously 3-7° relative to the plane formed by the unpatterned part of the working face. The pitch angle is at an inclined cutting angle relative to the centre line of the working face and the plane has at least one straight cutting surface shared with the unpatterned part. In this context, an essentially planar plane means a surface that is completely plane or slightly curved, if the milling cutter is articulated at the end of the shaft.

The piece of wood can have two grooves that are formed symmetrically relative to the centre line of the working face and each groove is adapted to rise from the edges of the working face towards the centre line. In this way, a symmetrical partial pattern can be made, which increases the connection possibilities of partially patterned pieces of wood to form a complete decorational wood structure. Furthermore, symmetrical cutting reduces warping that takes place over time around the longitudinal axis of the piece of wood.

The groove planes and the unpatterned part can have at least three straight cutting surfaces. In this way, a regular and repeating partial pattern can be formed in the piece of wood, which is impressive and utilisable for decorating in a versatile way. In addition, implementation of straight cutting edges is advantageous, since they can be implemented with a milling cutter with a straight blade.

Advantageously, the partial pattern is mechanically intermittently formed in the longitudinal direction of a decorational wood structure. In this way, a production speed suitable for industrial production is achieved and one larger pattern can be produced in the wood structure by intermittently repeating the same partial pattern.

A further object of the invention is to provide a device for patterning, which is suitable for use in patterning a piece of wood of many dimensions with only small adjustments and is more advantageous than prior art devices for patterning and more efficient regarding industrial production.

The purpose of the device for patterning that the invention relates to can be achieved with a device for decoratively patterning a piece of wood, said device for patterning including a processing head adapted to form a partial pattern onto a piece of wood and control equipment for controlling the processing head of the device for patterning. The processing head includes at least one milling cutter for forming a partial pattern onto a piece of wood as a groove and means for moving the milling cutter transversely to the piece of wood while the axis of rotation of the milling cutter is at an inclined angle relative to the working face plane in such a way that the groove depth changes in the transverse direction of the groove. Furthermore, the device for patterning includes means for supporting a piece of wood during partial patterning, and the length in the direction of the axis of rotation of the milling cutter and the diameter of the milling cutter are greater than or equal to the longest dimension of any one of the planes of the groove in the transverse direction of the groove. Such a device can be used to produce several different variations of patterning for a piece of wood quickly and affordably. A sufficiently large milling cutter in the device for patterning enables the formation of the groove that forms an individual partial pattern with one cutting movement of the cutter, which in turn enables providing patterns onto pieces of wood with different dimensions by merely adjusting the positioning of stoppers. In other words, the milling cutter is always at an angle relative to the working face of the piece of wood to be patterned in such a way that the milling cutter cuts a partial pattern onto the piece of wood with the blade edge producing a groove in the piece of wood the side length of which depends on the angle of the milling cutter.

Advantageously, means is arranged for moving the milling cutter essentially straight and at a pitch angle of 2-10°, advantageously 3-7° relative to the working face of the piece of wood. Thus, the movement track of milling cutters is simple and fast. In this context, 'essentially straight' means that the movement is either completely straight or almost straight in such a way that the milling cutter is articulated at the end of the arm, which cuts the piece of wood with a slightly curved movement relative to the working face.

Advantageously, the milling cutter is a pointed tip cutter with a straight blade. The tips of a pointed tip milling cutter are simple to replace and they can be removed and oriented in such a way that the outer diameter of the milling cutter does not change due to tip wear. This enables extremely high precision for patterning and prevents "running" of the pattern in adjacent pieces of wood, which would follow if the diameter of the milling cutter were to change.

The Z value of a pointed tip milling cutter, i.e. the number of tips, may range between 4 and 70; however, it is advantageously at least 6-50 and more advantageously 25-40. A high Z value increases the number of wood processing cuts during one rotation of the milling cutter enabling the use of higher movement speeds for the milling cutter without causing a tearing effect in the wood. When processing with a milling cutter with a high Z value, processing resembles rather sawing than grinding, which prevents tearing.

The diameter of the milling cutter may range between 150 and 1000 mm, advantageously between 170 and 400 mm. When using a sufficiently large diameter, the dimensions of the milling cutter are sufficient for forming partial patterns in pieces of wood with many different dimensions. This also allows the edge of a large milling cutter to be used in such a way that desired partial patterns can be steplessly cut at different depths. This is advantageous for accurate patterning of pieces of wood with different dimensions and thicknesses or tongue and groove boards.

Advantageously, the device for patterning includes at least two milling cutters located on both sides of the piece of wood relative to its longitudinal axis. With two milling cutters, a remarkably larger number of and more complicated partial patterns can be formed than with one milling cutter. Milling cutters that process the piece of wood are not necessarily located reflectedly on both sides of the piece of wood but can be set in different positions. Cutting can be performed intermittently in such a way that once one milling cutter has performed its cutting operation, the piece of wood can be moved to the cutting position of the following milling cutter. In this way, the milling cutters do not intersect with each other. The operation is based on optically intermittent control.

Advantageously, milling cutters rotate in opposite directions, which reduces cutting direction tearout in the piece of wood.

Advantageously, the milling cutter is adapted to be moved at an inclined cutting angle relative to the longitudinal direction of the piece of wood in such a way that the movement of the milling cutter takes place simultaneously both in the perpendicular direction relative to the plane of the piece of wood and linearly in the transverse direction of the piece of wood. In this way, the border of the groove in the partial pattern relative to the uncut surface can be made perpendicular to the longitudinal direction of the piece of wood.

According to an embodiment, the processing head is a robot equipped with a milling cutter. A robot can perform very accurate and versatile cuts in several different directions.

When the processing head is a robot, control means for controlling the milling head may consist of the control processor of the robot.

Advantageously, the length of the milling cutter is at least equal to the diameter of the milling cutter. This ensures that the edges of the milling cutter always come out from the material of the piece of wood.

Advantageously, control means for the device for patterning includes software means for algorithmic control of the device for patterning, adapted to divide the pattern of the wood structure into partial patterns. With software means, the desired pattern consisting of several partial patterns can be divided into partial patterns in pieces of wood while an algorithm automatically controls the blade angles of the milling cutter(s) of the device for patterning one piece of wood at a time when forming partial patterns.

It is known as prior art, for example, that wood is fed in a panel planer through the equipment using drive pulleys. In this device for patterning according to the invention, the same drive rollers can operate as a device for locking the piece of wood in place to provide a splitting feed method. Since the desired partial pattern of the piece of wood is produced by intermittent processing and by reflecting the same cut at the same place with a different milling cutter, the transfer of the piece of wood must be accurate. It is known that drive rollers of panel planers have a tendency to "slip" at times. For this reason, when processing this pattern, the transfer of the piece of wood must be monitored with either optical monitoring or another means independent of drive rollers' slip.

With the method according to the invention, a wood product, such as a fence board, is decorated deviating from the profile direction on one or more exterior faces, so that it can function in the same way as a fence board sawed at edges but, in addition, has a decorated exterior face. This difference leads to that the fence is three-dimensional also when viewed from the side. This so-called 3D patterned board can additionally form new patterns on the exterior face of the fence like a mosaic.

With the method according to the invention, patterned pieces of wood can be efficiently and flexibly produced in terms of both production and aesthetics. A sufficiently wide pattern model collection can be achieved with patterns and their variations, as well as products, provided with the method according to the invention. Advantageously, a simple pattern model collection is suitable for different cultural environments and thus efficiently finds the consumer market.

This invention provides a versatile decorative patterning method that can be used to produce mathematical decorative patterns that are efficiently and steplessly modifiable in sawn and dressed timber with various dimensions using the same cutting tools. Advantageously, the method for three-dimensional decoration based on mathematical intermittent feeding can be used as a dedicated quality and material bank. Thus, the same decoration can be industrially produced at different times.

To summarise, the invention relates to a method and a device for patterning that can be used to produce a decorational wood structure according to the invention. With the simple cutting method of the invention, a wide patterning system can be provided for industrial timber wood production. The invention solves both the aesthetic and productional problem related to production of a modifiable decoration suitable for different cultural environments in such a way that it is industrially and efficiently producable in most decorational wood structures. The pattern provided with the method according to the invention is formed of partial patterns based on a simple cutting method, the mathematical structure and system of which can be easily applied globally in both architecture and industrial design. Henceforth, a decorational wood structure is referred to as a decorative wood structure.

BRIEF DESCRIPTION OF THE DRAWINGS

The invention is described below in detail by referring to the appended drawings that illustrate some of the embodiments of the invention, in which:

FIGS. 2a-2f illustrate the partial pattern of a piece of wood according to the invention from different directions, FIGS. 5a-5c illustrate axonometric basic views of a device for patterning according to the invention.

DETAILED DESCRIPTION OF THE INVENTION

Figure 3:
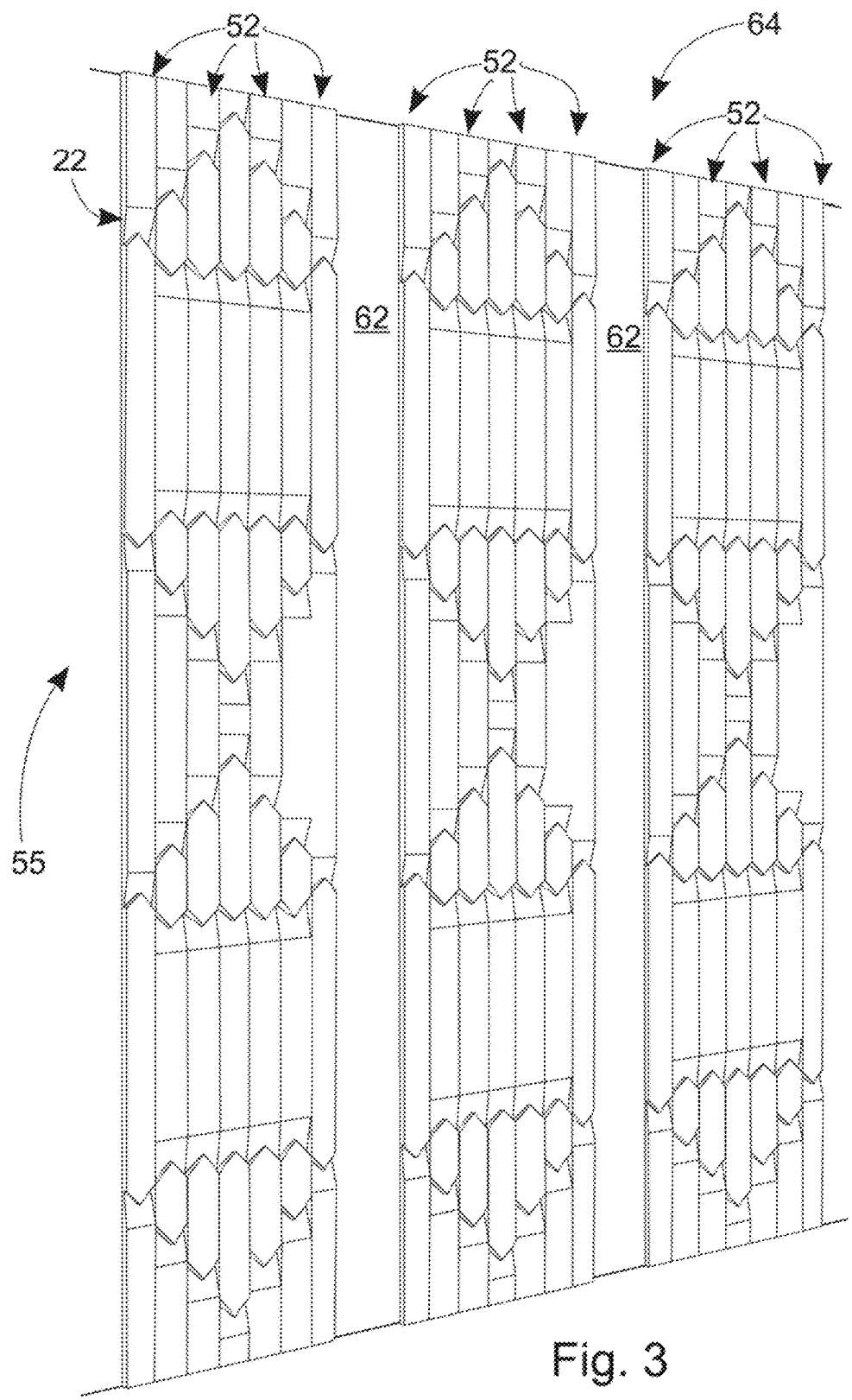
FIG. 3 illustrates an application of a decorative wood structure according to the invention on a wall.

In FIGS. 1a-1f, simple basic views of the operating principle of the method according to the invention are illustrated. In the method according to the invention for producing a pattern in a piece of wood, a piece of wood 10 is advantageously centrally fed to a device for patterning, a partial pattern 22 is processed onto the surface of the piece of wood 10 by means of the processing head of the device for patterning, and the piece of wood is removed from the device for patterning. The pieces of wood 10 with partial patterns are connected to form a decorative wood structure 11 wherein a pattern 55 is formed according to FIGS. 3 and 4, for example. In the method, a partial pattern 22 is processed onto the working face 26 of the piece of wood 10 using at least one milling cutter 16 advantageously provided with a straight blade which advantageously moves with parallel i.e. straight movements. Advantageously, the movement of the milling cutter can be reflected and it can be reciprocating.

A device for patterning according to the invention can be implemented with only slight modifications in existing panel planing machines that are already provided with a system for feeding a wood slab. In these machines, it is only necessary to add milling cutters that cut transversely in the profile direction and control means for mathematically controlling the milling cutter(s) with algorithmic control. The number and functions of the milling cutters to be added affect the number of decorations obtained and the processing speed of the decorative material.

Alternatively, a robot to which the milling cutter is fastened can be used as the processing head. In this case, the robot operates as both the control equipment of the device for patterning and means for moving the milling cutter.

Figure 1A:
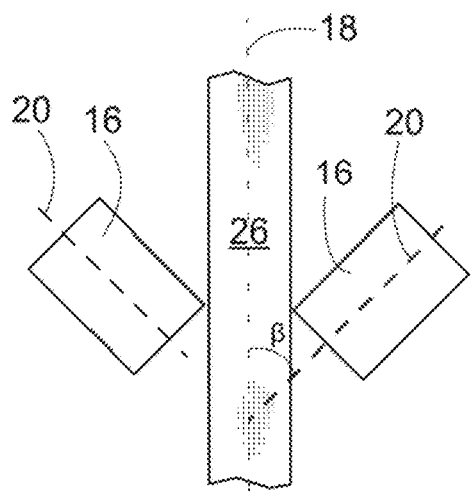
FIGS. 1a-1f are basic drawings illustrating the steps of the method according to the invention.
Figure 5B:
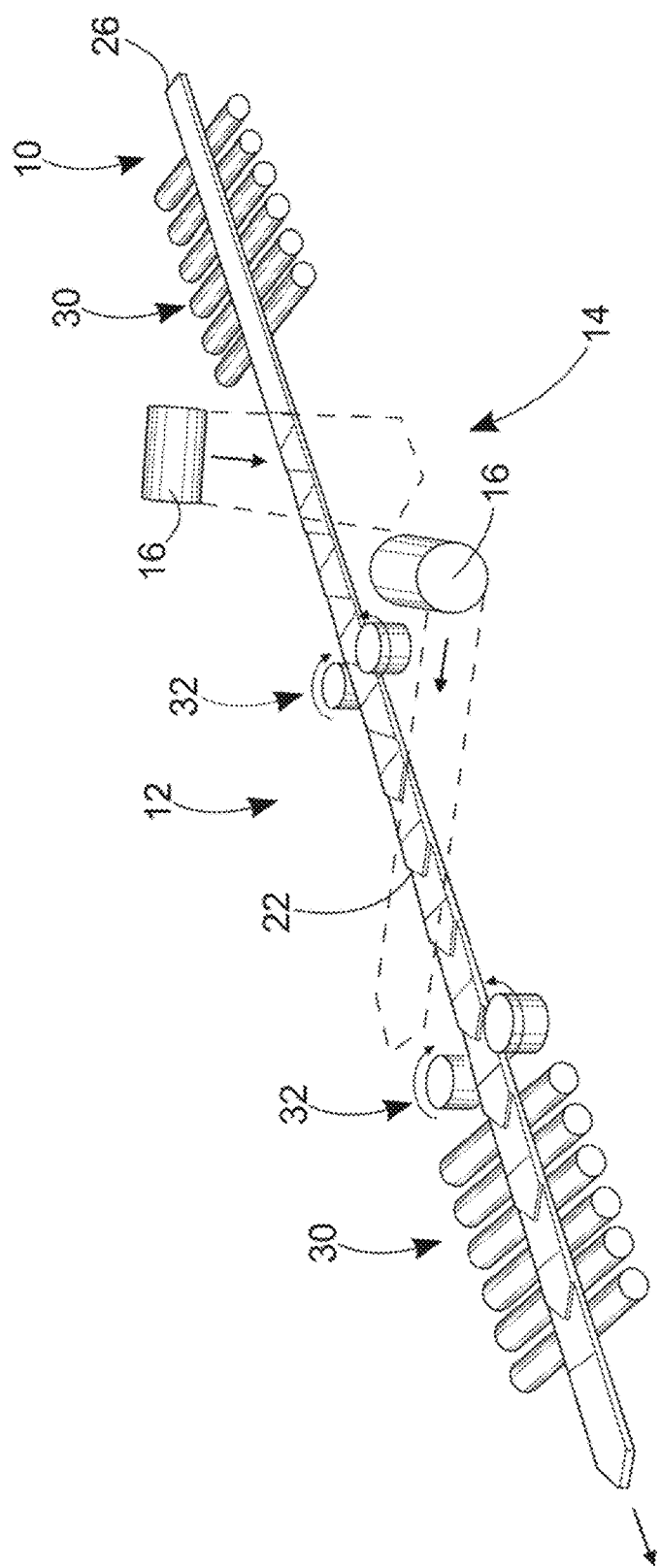
Figure 5C:
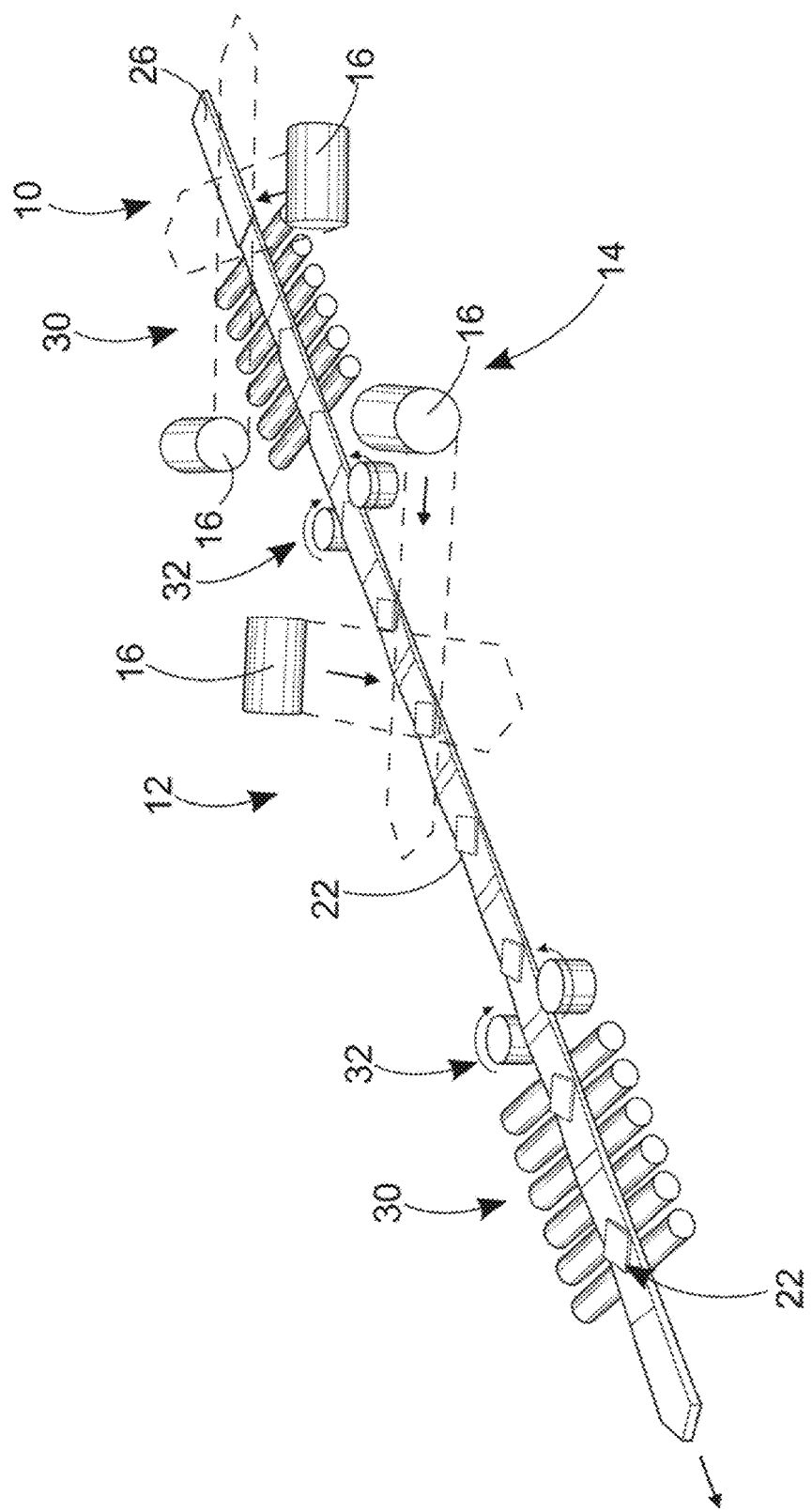

According to FIG. 1a, the piece of wood 10 can be fed to the device for patterning 12 centrally, i.e. so that the milling cutters 16 included in the processing head 14 of the device for patterning are both at an equal distance from the centre line 18 running in the longitudinal direction of the piece of wood. According to FIG. 5a, the device for patterning advantageously includes means 30 for supporting the piece of wood, against which the piece of wood 10 is supported during the processing. The base can be movable, a conveyor belt, for example, on which the piece of wood is placed automatically or manually. Advantageously, according to FIGS. 5a-6b, the base 30 is a platform composed of rollers with bearings, on which the piece of wood 10 can move forward. The device for patterning 12 can include transfer means 32, with which the piece of wood 10 is centred relative to the processing head and with which the piece of wood 10 is fed forward. The transfer means 32 simultaneously function as locking means for locking the piece of wood 10 to the base 30 for the duration of the patterning operation. The transfer means 32 may consist of feeding rollers that move the piece of wood 10 in its longitudinal direction. The transfer means 32 simultaneously function as stoppers providing lateral support for the piece of wood. In addition, the device for patterning 12 includes a processing head 14 for forming a pattern 22 onto the piece of wood 10, as well as control means for controlling the device for patterning 100.

Advantageously, the functions of the device for patterning are automatic and computer controlled; i.e. the control means of FIG. 5a is adapted to operate automatically based on the commands of the control unit C. The control unit advantageously controls the operation of the milling cutters and transfer means 32 relative to each other in a synchronised manner. The control means can change the orientation of the milling cutter in several different directions, among others, the angle relative to the horizontal plane at which the milling cutter encounters the piece of wood, the angle of the axis of rotation of the milling cutter relative to the horizontal plane, or the angle of incidence of the milling cutter relative to the longitudinal direction of the piece of wood, as well as the height level of the milling cutter at which it encounters the piece of wood. Advantageously, the method and device for patterning according to the invention use a control system based on a mathematical algorithm, wherein a mathematical script is converted with conversion software to a control language L suitable for the control means. With a control system based on a mathematical algorithm, the patterns of the wood structures to be produced can be first visualised with a computer that divides the pattern into separate pieces of wood and partial patterns to be formed in them using software means. For performing the division, dimensions of patterns and dimensions of the timber used are first inserted. For example, when the width of a pattern is 1000 mm, software means divide the pattern into ten 100 mm wide partial patterns, which are formed in the pieces of wood. At the same time, the software means create control commands for the milling cutter for partial patterning.

Figure 6A:
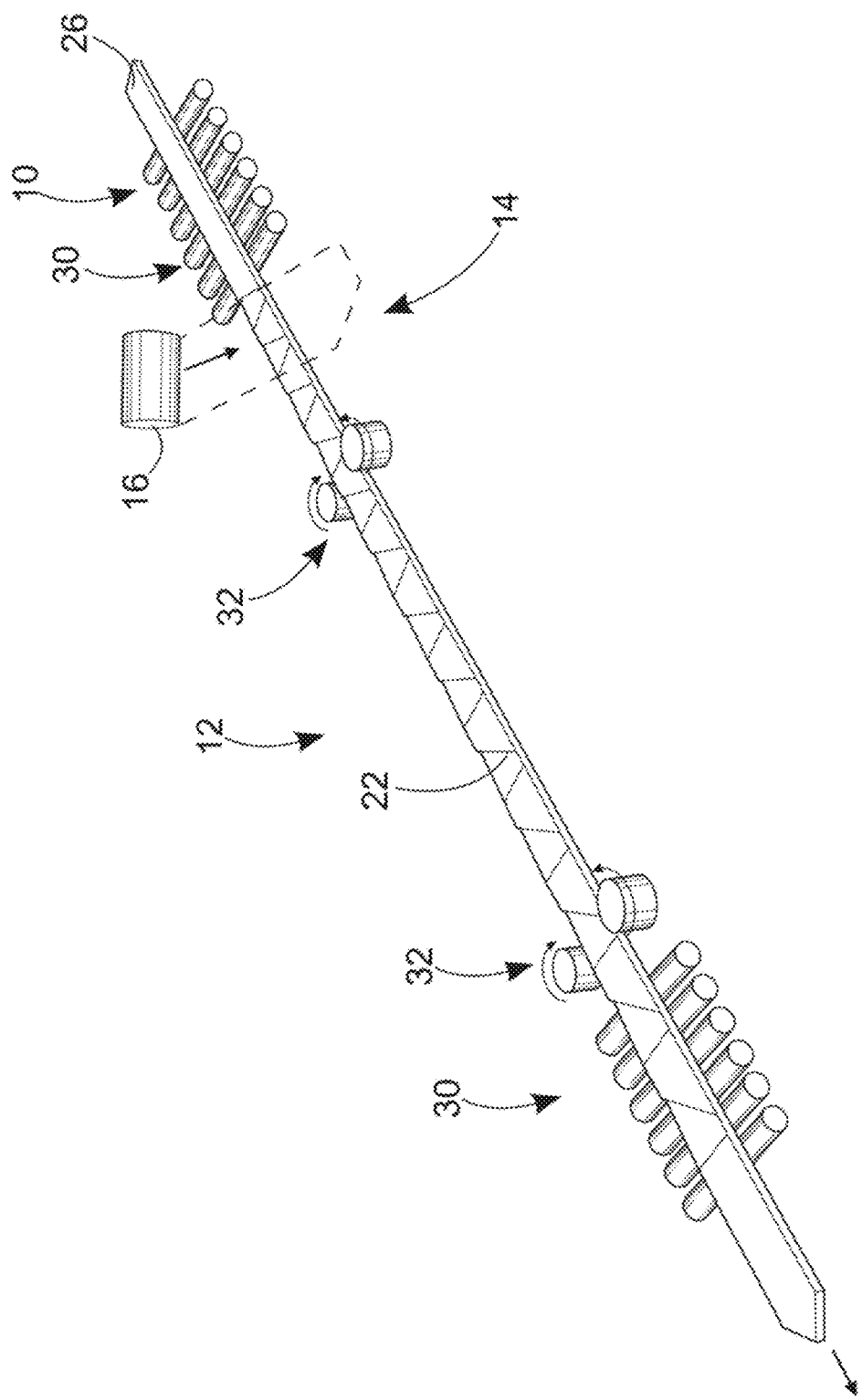
FIGS. 6a-6b illustrate axonometric views of the basic pattern of the method according to the invention and its reflection.
Figure 6B:
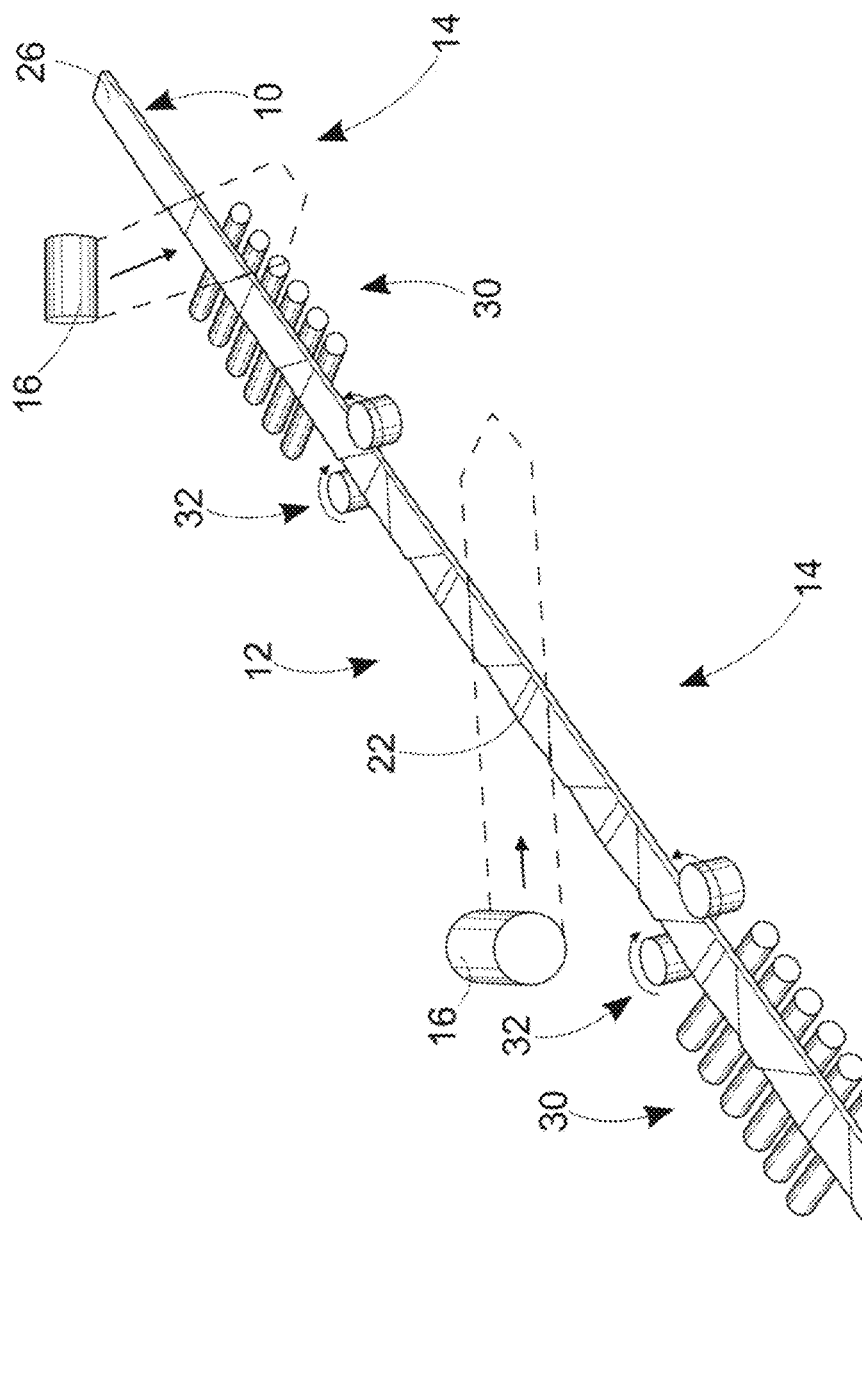

According to FIG. 6a, the processing head 14 includes at least one milling cutter 16 advantageously with a straight blade and means 34 for moving the milling cutter 16, said milling cutter 16 being adapted at an inclined cutting angle relative to the longitudinal direction of the piece of wood 10 to be moved. The number of milling cutters may also be two or more, according to FIGS. 5a-5c and 6b, in which case the formation of a pattern onto the piece of wood is easier. The device for patterning may include optical elements for monitoring the progress of the cutting process and the intermittency of the patterns. The device for patterning may additionally include a cutting device, for example. FIG. 6a illustrates the simplest configuration of the device for patterning where only one milling cutter is used.

Henceforth, milling cutters are used in the plural form since in this context, two milling cutters are displayed in most of the figures. However, it should be understood that the invention can also be implemented using one milling cutter according to FIG. 6a. Milling cutters 16 are advantageously rotationally jointed to arms that move the milling cutters, about their longitudinal axis 19. In turn, the arms can be moved, for example, with hydraulic cylinders along rails or other types of guides. The milling cutters rotate at a high speed, thousands or even tens of thousands of revolutions per minute. Each milling cutter includes at least one blade fastened to the frame of the milling cutter, the blade efficiently cutting the piece of wood during the rotation of the milling cutter. For example, the milling cutter can be rotated with a compressed air motor or an electric motor. According to FIG. 1a, the milling cutters 16 are placed at an inclined cutting angle β relative to the longitudinal centre line 18 of the piece of wood 10, so that a mathematical partial pattern can be produced in the piece of wood 10 based on their movement. Each milling cutter 16 is only moved, according to the invention, in one movement direction, which is advantageously perpendicular to the axis of rotation 20 of the milling cutter 16. The cutting angle β between the movement direction of milling cutters 16 and the piece of wood 10 influences the shape of the partial pattern formed. The cutting angle β may be 5-85°; advantageously, however, it is 30-60° and more advantageously 40-50°. When using the most advantageous cutting angle, the partial pattern formed with the method is very universal and is used in many cultures. Thus, it will reach a very large customer group.

Alternatively, milling cutters can be fitted at the ends of robots. As the robot, robots known from the automobile industry, such as robots known with the product name KUKA KRC-2, can be used, for example, or more advanced versions with a higher computing power. In this case, means for supporting the piece of wood can consist of a specific jig, onto which the piece of wood is supported during the formation of partial patterns. Furthermore, means for supporting the piece of wood may include transfer means that move the piece of wood away from the jig after partial patterning.

Figure 1B:
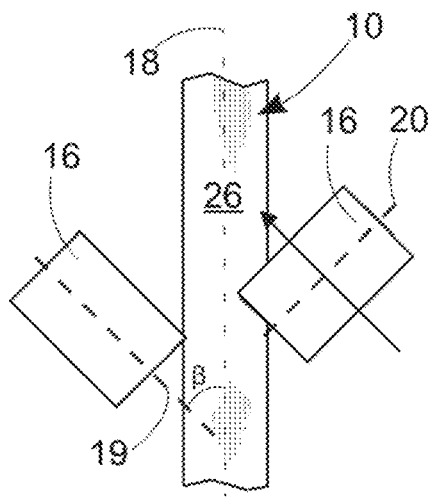
Figure 1C:
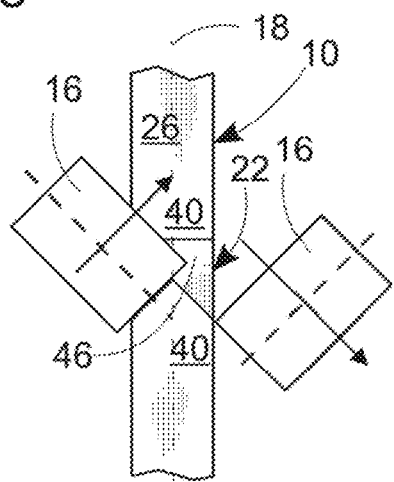

According to FIG. 1b, milling cutters 16 opposing each other relative to the centre line 18 of the piece of wood 10 are moved alternately, wherein one milling cutter 16 remaining in place when the other one 16 starts to move perpendicularly relative to its axis of rotation 20 and at an inclined angle relative to the piece of wood 10 towards the piece of wood 10. Advantageously, the milling cutter is simultaneously moved both transversely to the piece of wood and perpendicularly to the working face. Advantageously, the cut formed by the milling cutter 16 in the piece of wood 10 extends past the centre line 18 of the piece of wood 10 so that, according to FIG. 1c, the other milling cutter 16 completes the partial pattern 22 on the other side to form a partial pattern 22 according to FIG. 1d that is symmetrical relative to the centre line 18. Due to the cut, the partial pattern 22 is formed by a groove 25, processed onto the surface of the piece of wood, the depth of which changes in the longitudinal direction of the piece of wood.

Figure 1D:
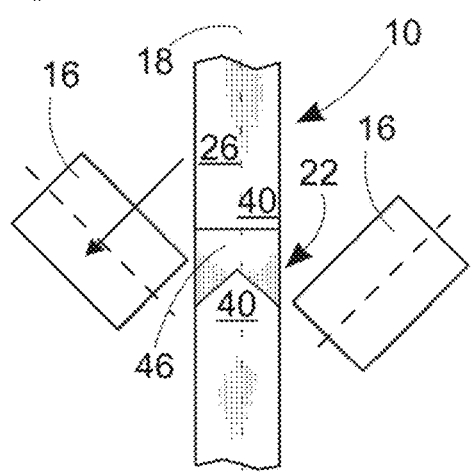

Once both milling cutters 16 have produced their own cuts in the piece of wood 10, a partial pattern 22 according to FIG. 1d has been formed. At the simplest, the partial pattern can be a partial pattern 22 according to FIG. 2c, which has been cut using only one milling cutter on one side of the piece of wood. By tilting the travel direction of the milling cutters 16 relative to the horizontal plane, it is possible to influence the cutting surface 45 of the partial pattern 22 that is formed between the partial pattern 22 and the working face 26 of the piece of wood 10. With correct tilting of the travel direction, the cutting surface 45 becomes a straight line, which is advantageously perpendicular to the centre line 18 of the piece of wood. If desired, the shape of the edge can also be a different symmetrical combination of two straight lines or curves. More precisely, tilting the travel direction relative to the horizontal plane means that milling cutters are moved with means straight, slightly diagonally upwards at a pitch angle of 2-10°, advantageously 3-7°, so that the milling cutter cuts the partial pattern 22 deeper, as shown in FIG. 2b, near the edges 44 of the piece of wood 10 than in the centre line 18 of the piece of wood, if two milling cutters are used. To make the cutting surface 45 of the partial pattern 22 to a straight line at a right angle relative to the centre line 18 of the piece of wood 10, the pitch angle of the milling cutters relative to the horizontal plane must be computed correctly regarding the width of the milling cutter, the width of the piece of wood and the thickness of the piece of wood, or determined through experimentation.

Figure 1E:
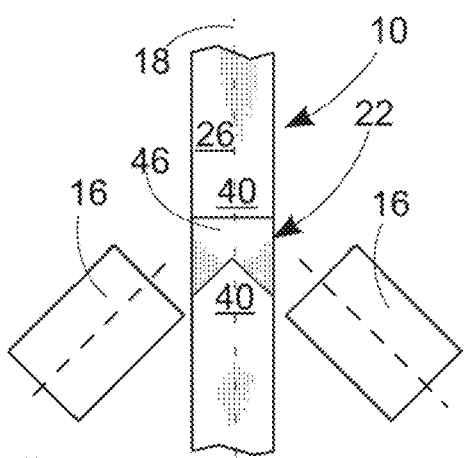

According to FIG. 1e, the device for patterning may also include another pair of milling cutters 16, which are placed reflectedly across the perpendicular centre line of the piece of wood relative to the milling cutters 16 in FIGS. 1a-1d.

Figure 1F:
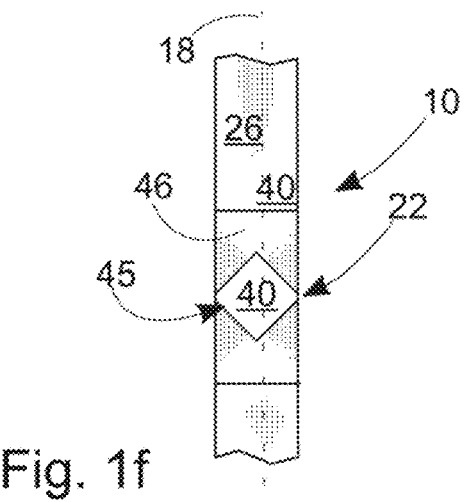

With these, the partial pattern 22 can also be completed to be symmetrical in the transverse direction of the piece of wood, according to FIG. 1f.

In the method, one piece of wood can be simultaneously processed with one or more pairs of milling cutters. Thus, several partial patterns can be simultaneously formed in the same piece of wood in different places in the longitudinal direction of the piece of wood. Since one milling cutter only processes in one direction, when processing a partial pattern that is symmetrical in the transverse direction of the piece of wood, the piece of wood must either be moved forward to the following milling cutters or turned horizontally by 180° so that the partial pattern can be processed the other way round. This is illustrated in FIG. 1e, where the milling cutters 16 are cutting towards an end that is different in the longitudinal direction of the piece of wood than in FIGS. 1a-1d.

The groove 25 of the partial pattern 22 formed with a method according to the invention includes, according to FIGS. 2a-2f, two planes 46, limited by cutting surfaces 45 that separate the planes 46 from the unpatterned part 40 of the working face 26, and an unpatterned centre part 41 of the partial pattern 22 that is limited to the cutting surfaces 45. According to an embodiment, the cutting surfaces 45 of the partial pattern 22 can be made to deviate from a straight line, i.e. curved, by moving the piece of wood in the longitudinal direction during the cutting of the milling cutters. In this way, different curved shapes can be produced. Advantageously, the unpatterned part 40 limited by the cutting surfaces 45 of the partial pattern 22 according to figure if has a thickness of the piece of wood 10 equal to that of the working face 26 of the piece of wood 10. The material layer of the piece of wood to be removed with the milling cutters 16, i.e. the depth of the groove 25, may range between 1-200 mm, advantageously between 3-20 mm, most advantageously between 8-12 mm, so that the partial pattern is visible. When removing material from the piece of wood, it is also possible to reduce internal stresses of the piece of wood, which tend to warp a piece of wood, particularly an elongated one, over time. Thus, the method according to the invention can be used to produce pieces of wood with partial patterns that warp less over time compared to prior art products.

Advantageously, the transfer means are steplessly adjustable regarding their position relative to the centre line of the piece of wood. This enables the processing of pieces of wood with different widths using the same device for patterning. For wide pieces, the milling cutters can be moved backwards with the means, for example, along guides until they are at a sufficient distance from each other so that the processable piece of wood fits between the milling cutters. Advantageously, milling cutters are also steplessly adjustable regarding the pitch relative to the horizontal plane of the travel direction for pieces of wood with different thicknesses.

Opposite milling cutters on the different sides of the piece of wood can operate alternately, whereas milling cutters in different positions in the longitudinal direction of the piece of wood can operate simultaneously, as long as the milling cutters placed opposite do not operate simultaneously. By changing the means of the device for patterning for supporting the piece of wood, i.e. the base and locking means, the method according to the invention can be used for producing patterns in pieces of wood with varying cross-sections with the limitation that generally a piece of wood to be patterned must have a working face with a minimum width and length of 40 mm and a minimum thickness of 10 mm. Even pieces smaller than this can be patterned with the method and device for patterning according to the invention. Due to the high speed of rotation of milling cutters, milling cutters can be fed against the piece of wood at a high speed without the milling cutters tearing the surface of the piece of wood. Thanks to this, the production of the pattern itself with the milling cutters can be a remarkably fast operation, lasting less than a second. The tearout produced by milling cutters can also be reduced by using a milling cutter whose Z value, indicating the number of blades, is at least 4, advantageously at least 6 and most advantageously more than 25.

However, it must be noted that the same processing method can be applied for very small pieces of wood and dimensions, such as edges of a pencil. The length of the piece of wood processed must advantageously be at least approximately one meter so that the use of the device according to the invention is reasonable. The width of the piece of wood processed is not so significant, since the pattern can be easily processed onto a thin outer edge of a board, for example.

Figure 7:
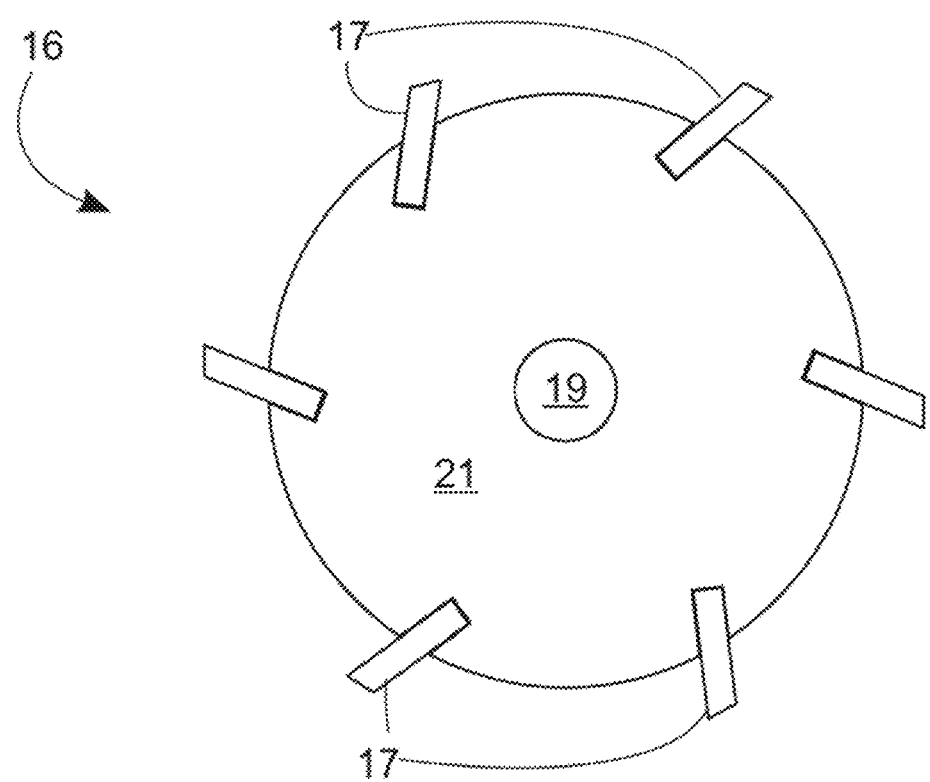
FIG. 7 illustrates a basic view of a pointed tip milling cutter advantageously used in the method and device for patterning according to the invention, shown in the direction of the axis of rotation.

Advantageously, the milling cutter 16 used in the device for patterning is a pointed tip milling cutter, the individual pointed tips 17 of which can be positioned, if required, so that the outer diameter of the milling cutter 16 always remains constant according to FIG. 7. Pointed tips 17 may be adjustably fastened to the frame 21 of the milling cutter 16. In a pointed tip milling cutter, HSS bits can be used as pointed tips. Thus, the method and device for patterning according to the invention can also basically be used to form very shallow grooves that form the partial pattern, since the precision of the control of the device for patterning, advantageously implemented in accordance with the control for CNC machine tools, is sufficient for that. The milling cutter used in the method and device for patterning according to the invention may be a horizontal or vertical milling cutter. The dimensions of the milling cutter can vary remarkably; however, the minimum diameter of the milling cutter in vertical cutters or the minimum length in horizontal cutters can be 150 mm, and advantageously at least 170 mm, in which case the maximum width of the piece of wood to be partially patterned can be the diameter/length of the milling cutter. The speed of rotation of the milling cutter may be, for example, 5500 revolutions per minute for a pointed tip milling cutter with a diameter of 170 5 mm and a Z value of 6, which is moved or fed at a speed of 0.4 m/s. In this case, the output of the electrical motor rotating the milling cutter can be in a class of 3-4 kW.

Advantageously, several partial patterns can be made in one piece of wood intermittently, at intervals of 50 cm, for example. The partial pattern can be the same, but it can also be different. The decorative wood structure 50 according to the invention includes, according to FIG. 2c, at least two pieces of wood 10 having a working face 26, which includes at least one partial pattern 22 and an unpatterned part 40, said working face 26 having a centre line 18 and edges 44. The groove 25 that forms the partial pattern 22 has two essentially planar planes 46 of which one plane 46 is at a pitch angle of 2-10°, advantageously 3-7° relative to the plane formed by the unpatterned part 40 of the working face 26, the pitch angle being at an inclined cutting angle relative to the centre line 18 of the working face, and the working face 46 having at least one straight cutting surface 45 shared with the unpatterned part 40. Since the planes 46 are always at a right angle relative to each other due to the milling cutter with a straight blade, the second plane 46 is then at an angle of 80-88° relative to the unpatterned part 40.

If two milling cutters are used for producing the wood structure, the pattern of the decorative wood structure advantageously has two grooves 25, the planes 46 of which are formed symmetrically across the centre line of the working face 26, and each plane 46 is adapted to rise from the edges 44 of the working face 26 towards the centre line 18. Advantageously, the planes 46 of the two grooves 25 and the unpatterned part 40 have at least three straight cutting surfaces 45.

Decorative wood structures according to the invention have higher quality than corresponding prior art products, since the partial pattern is produced onto the surface of the piece of wood by milling and not, for example, by gluing it from a separate piece of wood. Products manufactured in this way are durable and the pattern cannot detach from the surface of the piece of wood in any stage as it is an integral part of the piece of wood.

A decorative wood structure according to the invention enables the use of a remarkable number of different construction materials, in which patterning has not been traditionally possible due to its high production costs. In other words, the method according to the invention provides the possibility to decorate a remarkable number of different construction materials in the same style using the same device. Traditionally, the same pattern cannot have been used for several different products. Such decorative wood structures may include completed patterned boards, planks, panels, decorative wall elements and end pieces manufactured from patterned boards, glulam panels, glulam beams, roof trusses, CLT beams, doors, battenboards, casements, decorative ceilings and equivalent wood products, in which the product surface remains visible.

According to an embodiment, the partial pattern can be made onto each side of a piece that has, for example, a rectangular cross-section by turning the piece of wood 90° about its longitudinal axis, achieving thereby a decorative wood structure or a decorative wood beam having a pattern formed by the partial patterns. Alternatively, the partial pattern can be made onto every second side of a piece that has, for example, a rectangular cross-section by turning the piece of wood 180° about its longitudinal axis. Decorative wood boards can also be used in combinations, for example, in roof framing units, or a decorative wood structure can be combined with conventional construction materials, such as hardboard.

Figure 4:
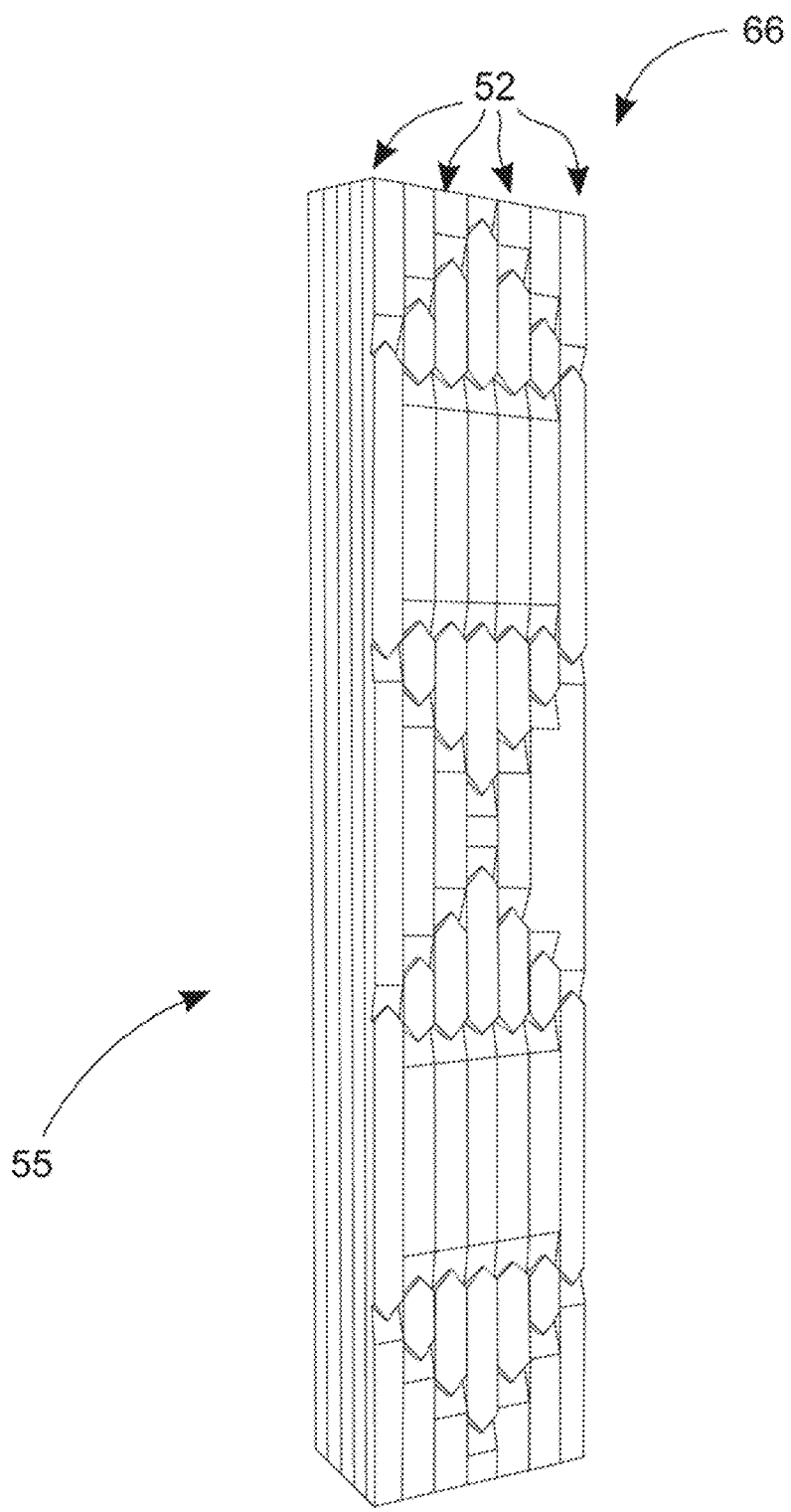
FIG. 4 illustrates an application of a decorative wood structure according to the invention in a CLT beam.

According to FIG. 4, a decorative wood structure can also be used on the surfaces of complete construction elements, such as CLT or cross laminated timber beams 66. In this case, decorative wood boards are glued onto the surface of the CLT beam in the desired order.

Since the partial pattern achieved with cutting is symmetrical, it can be modified and varied with mathematical methods, for example, by reflecting, multiplying or intermittent processing. Patterns achieved by combining partial patterns in this way can be modified by adding cuts on both sides of the centre line of the piece and by steplessly adjusting the angles and depths of the cuts. The method can provide new variations that belong to the aesthetically same form language. Regarding the industrial process technique, modifications and cuts can be made quickly and accurately in one processing stage using automation-technical controls, which utilise a material and standard bank. The principle of the method according to the invention consists of producing a mathematical cut that deviates from the profile direction of a piece of wood, which is provided efficiently and in a controllable way onto wood product surfaces with various sizes. In the method, the mathematical decoration of an individual profile can be produced intermittently in such a way that, by adapting intermittently decorated profiles side by side, the mathematical effect of partial patterns will be multiplied in the pattern of the decorative wood structure like in a mosaic.

For controlling the device for patterning, a so-called material or standard bank may exist, in which the models of desired patterned pieces of wood including dimensional data and movement tracks of milling cutters have been saved. For the desired product, the model is retrieved from the bank to the device for patterning, which produces the product according to the model data. The patterning of the method can be controlled with a mathematical system, which is used to reflect, divide and multiply the patterns onto the surface of a piece of wood. With a so-called intermittent feed method, various partial patterns can be formed onto the surface of a material, these partial patterns functioning together as a pattern like a mosaic when pieces of wood with partial patterns are installed side by side. The end product is a decorative wood structure of the same style in all timber dimensions. Thus, it is easy for a user to apply different, even complicated patterns in desired applications by ordering the pattern as a whole, and the sawmill will then produce the necessary pieces of wood with different partial patterns, such as decorative boards, which the user can combine to produce a decorative wood structure provided with the selected pattern. A user can be anyone from private persons to architects and industrial designers.

The control of the device for patterning and the method can be carried out using algorithms of the kind presented in the work by Tuulikki Tanska and Toni Österlund, "Algoritmit puurakenteessa" (algorithms for a wood structure) (ISBN 978-952-62-0456-7). With an algorithm, a decorative wood structure consisting of pieces of wood displayed on a graphic user interface can be first used to form a script created by the algorithm and using specific conversion language software, this script can be converted into an input language that is understandable to a device for patterning that functions like a CNC tool, based on which language the device for patterning controls the orientation and angle of blades. The algorithm divides the pattern of the decorative wood structure among individual pieces of wood and computes the blade parameters of the milling cutter that are necessary for producing the partial patterns required in an individual piece of wood.

Figure 8A:
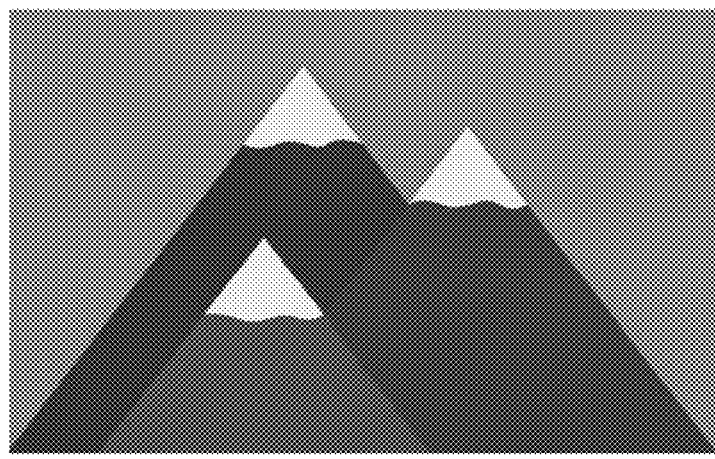
FIGS. 8a-8e illustrate the steps of the method according to the invention when the method is used for creating a pattern based on a photograph.
Figure 8B:
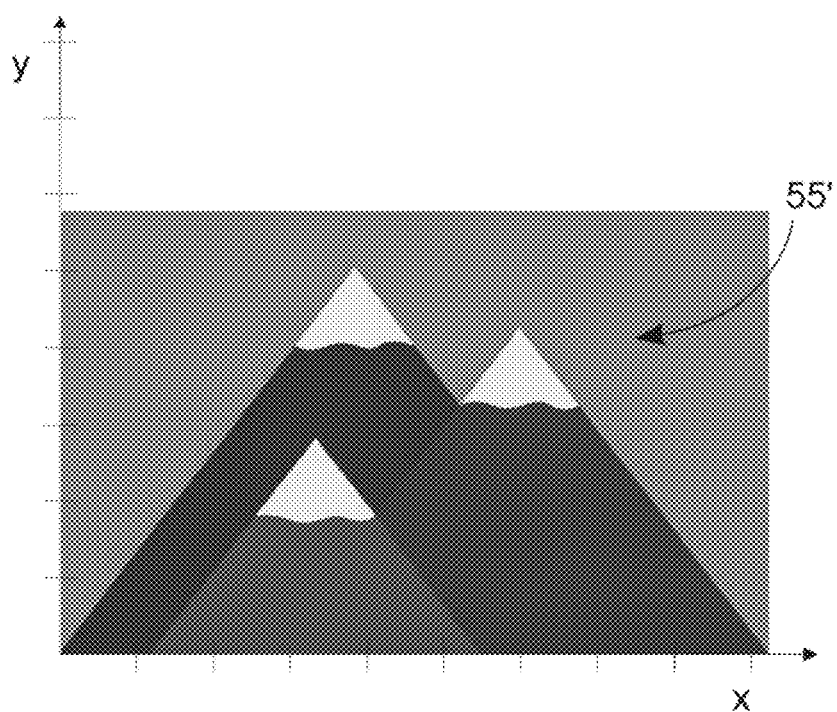
Figure 8C:
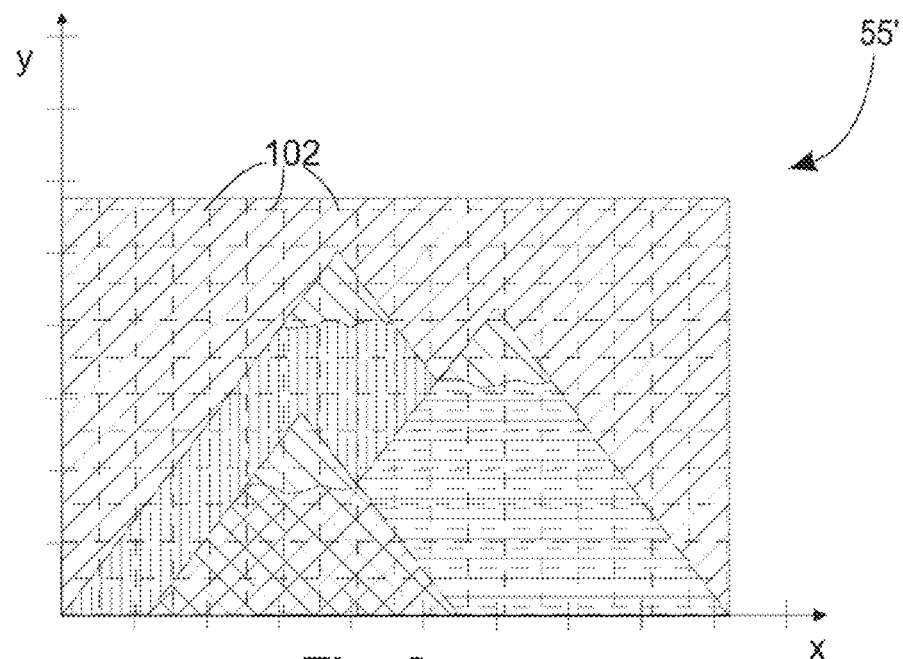

In FIGS. 8a-8e it is disclosed a basic view illustrating the steps of the method according to the invention when the wood structure and its pattern are produced based on an image in this embodiment. According to FIG. 8a, the starting point for production is an image including the entire pattern model 55'. Dimensions and coordinates are defined for the pattern model 55' according to FIG. 8b. The pattern model 55' selected according to FIG. 8c is divided into rasters 102 of an equal size according to the selected raster size, these rasters forming the pattern 55 in the pieces of wood connected side by side. The flank dimension of each raster 102 is the width of the piece of wood, at the minimum. Advantageously, the raster is a square. With software means, a possibly coloured pattern model 55' is converted to greyscales and the different greyscales are classified based on their darkness degree according to FIG. 8d. Advantageously, based on the darkness degree of the pattern, separate areas are limited in the pattern, each of which has the same single-cut depth and thereby the colour effect of the complete piece of wood.

Figure 8D:
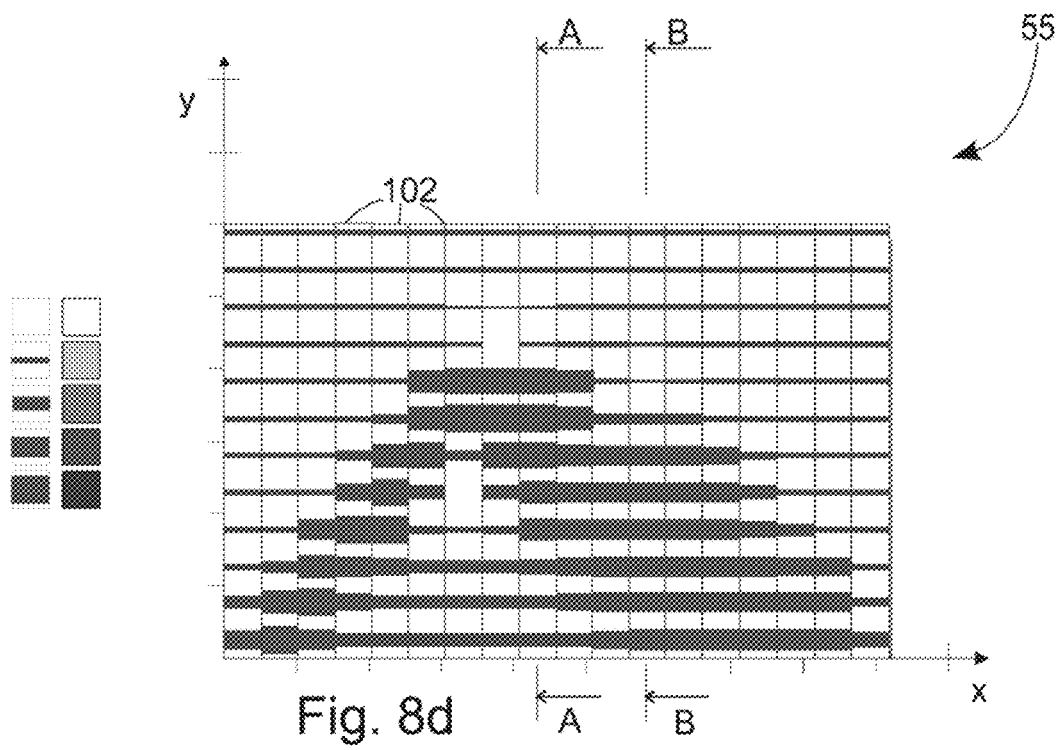
Figure 8E:
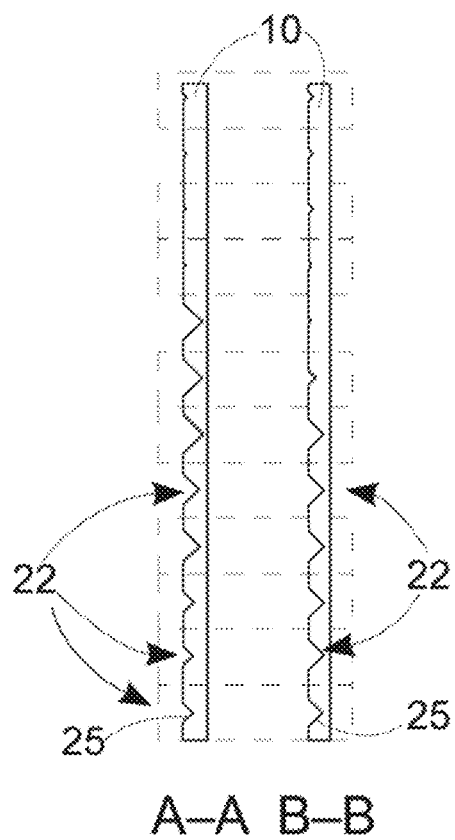

A raster-specific processing command is created based on the tone of darkness of each raster. The tone of darkness of each raster determines the depth of the single-cut of this raster, and the darker the colour, the deeper the cut, which in turn is visible in the complete product as a darker point in the piece of wood due to light and shadows. Advantageously, the depth of a 12 mm single-cut, for example, is divided into 16 different depths, each of which gives a colour effect of its own to the complete piece of wood. Varying depths of single-cuts are illustrated in FIG. 8e. Optionally, processing commands based on a CNC control of rasters of the same x or y coordinate are finally collected as a set of processing commands specific to each piece of wood, based on which each piece of wood is patterned according to FIG. 8d. Finally, numbered pieces of wood are assembled into a complete wood structure 10 according to FIG. 8d, which includes the pattern 55. In this context, it should be understood that although the pattern 55 shown in FIG. 8d is rather rough, the precision of patterning can be increased by reducing the raster size and thereby increasing the number of pixels in the figure so that smaller details can be represented with a higher definition.

It is understood that the above description and the figures related thereto are only intended to illustrate the present invention. Thus, the invention is not only limited to the embodiments described above or those set forth in the claims, but many different variations and modifications of the invention, which are possible within the inventional idea specified in the appended claim, will be apparent for those skilled in the art.

The invention claimed is:

1. A method for mechanically producing a wood structure with a decorational pattern, the wood structure having a plurality of pieces of wood, each piece having two edges, the method comprising the steps of:

dividing the decorational pattern of the wood structure into partial patterns using software means, forming movement tracks of at least one milling cutter of a processing head of a device to process the wood structure based on the partial patterns using the software means, processing partial patterns onto a working face of the plurality of pieces of the wood structure by moving, with a processing movement, the at least one milling cutter of a processing head of a device for patterning transversely to each piece of wood with an axis of rotation of the milling cutter at an inclined angle relative to a plane of said working face forming grooves of each partial pattern, each of the grooves having two planes set at an angle relative to each other and a changing depth in a transverse direction of the groove, forming several grooves successively onto the working face of said plurality of pieces of wood with one said processing movement, each processing movement starting or ending at the edge of the piece of wood, and forming the wood structure by placing said plurality of pieces of wood side by side wherein the partial patterns together form the decorational pattern of the wood structure.

2. The method according to claim 1, wherein the method includes using a milling cutter having a length in the direction of the axis of rotation and a cross-directional diameter greater than or equal to a longest dimension of any one of the planes of the groove in the transverse direction of the groove.

3. The method according to claim 1, wherein each groove is formed with one movement of the milling cutter.

4. The method according to claim 1, wherein each processing movement is straight.

5. The method according to claim 1, wherein partial patterns of the pieces of wood of the wood structure are formed by mathematically multiplying or dividing a length of the groove relative to a center line of the working face of the wood structure.

6. The method according to claim 1, wherein said partial patterns are processed onto the working face, said working face being formed onto a surface of the wood structure with a smaller dimension to achieve a higher processing depth for the groove and a higher precision.

7. The method according to claim 1, wherein the planes of each said groove are at a right angle relative to each other.

8. The method according to claim 1, wherein said pattern is formed in steps based on an existing pattern model, the steps including:

selecting a pattern model to be formed in the wood structure, specifying dimensions and coordinates of a pattern model, dividing the pattern model into rasters according to the dimensions of the piece of wood to be partially patterned and said dimensions of the pattern model, determining a darkness degree of the partial pattern in each raster, determining a depth of a single-cut of the raster based on the darkness degree of each raster, and creating control commands for the device for patterning for producing partial patterns in individual pieces of wood based on the depth of the single-cut.

9. The method according to claim 8, wherein each depth of the groove of the partial pattern is selected based on the darkness degree determined in the raster of the pattern model in such a way that the depth of the groove increases as the darkness of the raster increases.

* * * * *